United States Patent [19]

Achtenberg et al.

[11] Patent Number: 4,870,130
[45] Date of Patent: Sep. 26, 1989

[54] MOISTURE-HARDENING ONE-COMPONENT POLYSILOXANE COMPOSITIONS

[75] Inventors: Theo Achtenberg; Hans-Gerd Metzinger, both of Leverkusen; Hans Sattlegger, Odenthal-Gloebusch; Karl-Heinz Sockel, Leverkusen; Wilhelm Weber, Cologne, all of Fed. Rep. of Germany

[73] Assignee: Bayer Aktiengesellschaft, Leverkusen, Fed. Rep. of Germany

[21] Appl. No.: 259,785

[22] Filed: Oct. 19, 1988

[30] Foreign Application Priority Data

Oct. 31, 1987 [DE] Fed. Rep. of Germany ....... 3736993

[51] Int. Cl.$^4$ ................................................ C08K 3/14
[52] U.S. Cl. ..................................... 524/787; 528/16; 528/17; 528/18; 528/34; 528/901; 524/860; 524/788; 524/789
[58] Field of Search .................. 528/34, 16, 17, 18, 528/901; 524/860, 789, 787, 788

[56] References Cited

U.S. PATENT DOCUMENTS

| | | | |
|---|---|---|---|
| 3,364,160 | 1/1968 | Golitz et al. | 528/18 |
| 3,686,357 | 8/1972 | Cheeseman | 525/477 |
| 4,489,191 | 12/1984 | Chung | 528/34 |
| 4,555,420 | 11/1985 | Lucas | 528/34 |

Primary Examiner—Melvyn I. Marquis
Attorney, Agent, or Firm—Connolly and Hutz

[57] ABSTRACT

Polysiloxane compositions which harden in the presence of moisture by elimination of alcohols, which have high stability in storage while unvulcanized in the absence of moisture, which exhibit good adhesion to substrates, and which are improved by the presence of stabilizing silyl derivations of N-methyl benzamide contain:

(A) 100 parts by weight of a polydimethyl siloxane which contains terminal diorganyloxyorganosilyl or triorganyloxylsilyl groups and which has a viscosity of 0.1 to 100 Pas, (B) 0 to 100 parts by weight of an α,ω-bis(trimethylsiloxy)-polydimethyl siloxane which has a viscosity of from 0.04 to 10 Pas, (C) 0 to 5 parts by weight of an alkoxysilane having the formula

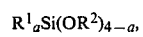

in which
$R^1$ is $C_1$-$C_6$ alkyl, $C_2$-$C_6$ alkenyl or $C_5$-$C_6$ aryl;
$R^2$ is $C_1$-$C_6$ alkyl, and a is 0 or 1, (D) 0.1 to 5 parts by weight of an aminoalkyl alkoxysilane containing one or more basic nitrogen atoms attached to a silicon atom through at least 3 carbon atoms, (E) 5 to 250 parts by weight of a reinforcing or non-reinforcing filler or filler mixture, (F) 0.01 to 2 parts by weight of an organometallic catalyst and (G) 0.5 to 5 parts by weight of an amidosilane of the formula

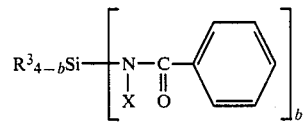

in which each $R^3$ is the same or different from any other $R^3$ and is $C_1$-$C_6$ alkyl, $C_2$-$C_6$ alkenyl, $C_5$-$C_6$ aryl or unbranched or branched $C_1$-$C_6$ alkoxy; X is a $C_1$-$C_4$ alkyl; and b is 1 or 2.

12 Claims, No Drawings

MOISTURE-HARDENING ONE-COMPONENT POLYSILOXANE COMPOSITIONS

This invention relates to one-component silicone systems (hereinafter referred to as 1-C-RTV compositions) which harden under the effect of moisture by elimination of alcohols, have high stability in storage in the unvulcanized state, show good adhesion to many substrates and are produced using stabilizing silyl derivatives of N-methyl benzamide.

BACKGROUND OF THE INVENTION

Several 1-C-RTV systems which harden by elimination of alcohols are already known. U.S. Pat. No. 3,161,614 describes formulations based on polydimethyl siloxanes containing 2 or 3 alkoxy groups at either end of the chain. The crosslinking catalysts mentioned include dialkyl tin dicarboxylates and amines. According to U.S. Pat. No. 3,686,357, dialkyl tin dicarboxylates are combined with certain aminoalkyl silane derivatives. In addition, it is mentioned that silanes capable of reacting with OH groups, so-called scavengers, have a stabilizing effect on the unvulcanized products. The combination of tin catalysts with aminoalkyl silanes in formulations containing the alkoxy-terminated polysiloxanes mentioned is also part of Japanese patent specification 53 102956 and EP-PS 21 859. The alkoxy-terminated polysiloxanes are also used in U.S. Pat. No. 4,395,526. Metal catalysts, above all dialkyl tin(IV) derivatives, amines (so-called accelerators) and OH-reactive silanes (so-called scavengers) are described as "constituents according to the invention". The patent specification contains a list of most of the silane derivatives known for the production of 1-C-RTV compositions as scavengers and states that amidosilanes are preferred. 1-C-RTV compositions containing amidosilane and alkoxysilyl groups are for their part the subject of U.S. Pat. No. 3,364,160 and U.S. Pat. No. 4,434,283. Finally, it is shown in U.S. Pat. No. 4,458,055 that amidosilanes react spontaneously with aminoalkyl silanes. The reaction products are described as crosslinkers in 1-C-RTV systems. The formulations prepared in accordance with the cited patent specifications have disadvantages. Formulations according to U.S. Pat. No. 3,161,614, U.S. Pat. No. 3,686,357, JP-PS 53 102 956 and U.S. Pat. No. 4,748,166 show relatively poor stability in storage in the unvulcanized state. After storage, particularly at elevated temperature, they lose their crosslinkability relatively quickly. If additions of amidosilanes are used as scavengers, as is preferably the case according to U.S. Pat. No. 4,395,526, high stability in storage can be obtained. However, a quantity of the N-methyl carbonamidosilanes of aliphatic carboxylic acids mentioned in the cited patent which is sufficient for the desired effect results in a loss of adhesion on many substrates. Finally, the desired combination of properties may be obtained in accordance with U.S. Pat. No. 4,458,055. However, this requires a relatively high proportion of silylated aminoalkyl silanes or of amidosilanes combined with aminoalkylsilanes. This can give rise to disadvantages in the reversion stability of the vulcanizates.

Accordingly, the object of the invention is to provide alkoxy systems showing good adhesion and high stability in storage.

BRIEF DESCRIPTION OF THE INVENTION

The present invention relates to polysiloxane compositions which can be stored in the absence of moisture and which harden in the presence of moisture, obtainable by mixing (1) 100 parts by weight of a polydimethyl siloxane which contains terminal diorganyloxyorganosilyl or triorganyloxysilyl groups and which has a viscosity of 0.1 to 1000 Pas, (2) 0 to 100 parts by weight of an α,ω-bis-(trimethylsilxoy)-polydimethyl siloxane which has a viscosity of from 0.04 to 10 Pas, (3) 0 to 5 parts by weight of an alkoxysilane having the following formula

in which
$R^1$ is $C_1$–$C_6$ alkyl, $C_2$–$C_6$ alkenyl or $C_5$–$C_6$ aryl;
$R^2$ is $C_1$–$C_6$ alkyl, and
a is 0 or 1, (4) 0.1 to 5 parts by weight of an aminoalkyl alkoxysilane containing one or more basic nitrogen atoms attached to a silicon atom through at least three C atoms, (5) 5 to 250 parts by weight of a reinforcing or non-reinforcing filler or filler mixture, (6) 0.01 to 2 parts by weight of an organometallic catalyst and (7) 0.5 to 5 parts by weight of an amidosilane, characterized in that the amidosilane (7) has the following formula

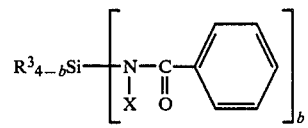

in which
$R^3$ is the same or different from any other $R^3$ and is $C_1$–$C_6$ alkyl, $C_2$–$C_6$ alkenyl, $C_5$–$C_6$ aryl or unbranched or an optionally branched $C_1$–$C_6$ alkoxy;
X is a $C_1$–$C_4$ alkyl, and
b may assume the value of 1 or 2.

DETAILED DESCRIPTION OF THE INVENTION

It has surprisingly been found that products showing excellent stability in storage can be obtained using the amidosilanes mentioned without any disadvantages arising in regard to adhesion. The 1-C-RTV systems obtained in this way are also distinguished by rapid hardening, minimal surface tackiness and high reversion stability of the vulcanizates.

The diorganyloxyorganosilyl- or triorganyloxysilyl-terminated polydimethyl siloxanes mentioned as constituent (1) may be prepared from α,ω-dihydroxy polydimethyl siloxanes and alkoxysilanes of the type defined as constituent (3) using suitable catalysts, such as amines or hydroxylamine derivatives. As described in DE-PS 3 523 206, particularly suitable catalysts are carbamate derivatives of low-boiling amines. The preferred organyloxy group is the methoxy group. In a particularly preferred embodiment, the chain is terminated by the dimethoxymethylsilyl group which may be obtained from α,ω-dihydroxypolydimethyl siloxanes and methyl trimethoxy silane. Accordingly, the invention is also applicable to polysiloxanes which contain other substituents besides methyl groups, for example phenyl groups.

The α,ω-bis-(trimethylsiloxy)-polydimethyl siloxanes mentioned as constituents (2) are known and are commercially available. These plasticizing polysiloxanes may be completely or partly replaced by other polysiloxanes or by nonsilicone materials. Polymers consisting of $CH_3SiO_{1.5}$, $(CH_3)_2SiO$ and $(CH_3)_3SiO_{0.5}$ units are mentioned as examples of other already known silicone plasticizers.

The alkoxysilanes (3) may be the same as or different from those used for the preparation of the polysiloxane (1). $CH_3Si(OCH_3)_3$, $Si(OC_2H_5)_4$, $CH_2=CH—Si(OC_2H_5)_3$, $C_6H_5Si[OCH—(CH_3)C_2H_5]_3$ and $CH_3Si(O\ n—C_3H_7)_3$ are mentioned as examples.

Suitable aminoalkyl alkoxysilanes (4) are such compounds as $H_2NCH_2CH_2CH_2Si(OC_2H_5)_3$, $H_2NCH_2CH_2NHCH_2CH_2CH_2Si(OCH_3)_3$, $H_2NCH_2CH_2CH_2SiCH_3(OC_2H_5)_2$ and $HN[CH_2CH_2CH_2Si(OC_2H_5)_3]_2$. Other compounds of this type have been described as adhesion promoters or crosslinkers for silicone systems (cf. for example U.S. Pat. No. 3,888,815).

Suitable fillers (5) are reinforcing fillers, such as pyrogenic or precipitated silica and precipitated chalk, and also non-reinforcing mineral materials, such as carbonates (chalk, dolomite), silicates (clay, slate powder, mica, talcum, wollastonite), $SiO_2$ (quartz), diatomaceous earth) and carbon black. The surfaces of the fillers may be modified by known hydrophobicizing agents, such as long-chain carboxylic acids and reactive silanes.

Particularly suitable metal catalysts (6) are derivatives of titanium, aluminium and tin. Preferred metal catalysts are tin catalysts, especially dialkyl tin dicarboxylates, for example $(C_4H_9)_2Sn(OCOCH_3)_2$, $(C_8H_{17})_2Sn(OCOC_{11}H_{23})_2$ and $(C_4H_9)_2Sn[OCOCH(C_2H_5)C_4H_9]_2$.

The following are mentioned as examples of the amidosilanes (7): $(CH_3)_3SiN(CH_3)COC_6H_5$, $(CH_3)_2Si([N(CH_3)COC_6H_5]_2$, $CH_3(CH_2=CH)Si[N(CH_3)COC_6H_5]_2$, $CH_3(C_6H_5)Si[N(CH_3)COC_6H_5]_2$, $CH_3(C_2H_5O)Si[N(CH_3)COC_6H_5]_2$, $CH_3(C_2H_5O)_2SiN(CH_3)COC_6H_5$, $CH_3(CH_3O)Si[N(CH_3)COC_6H_5]_2$ and $CH_3[C_2H_5(CH_3)CHO]_2SiN(CH_3)COC_6H_5$.

The N-methylbenzamide group may be replaced by N-methyl carbonamide groups substituted at the aromatic component, although this does not afford any advantage. The same applies to the replacement of the N-methyl group by N-ethyl or N-propyl groups. Silanes liquid at room temperatures, such as $(CH_3)_3SiN(CH_3)COC_6H_5$ or $CH_3(C_2H_5O)Si[N(CH_3)COC_6H_5]_2$, are preferred. The production of N-methylbenzamidosilanes is known. To this end, the corresponding chlorosilanes are reacted with N-methyl benzamide in the presence of acid-binding agents. Suitable acid-binding agents are, for example, amines, such as triethyl amine.

It is known from DE-PS 3 114 773 that the aminoalkyl silanes (4) react on mixing with the amidosilanes (7) to form the corresponding silylated aminoalkyl silanes with elimination of free amide, for example in accordance with the following scheme:

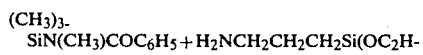

or

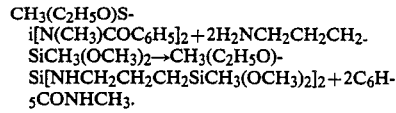

Accordingly, silylated aminoalkyl silanes of the type formed in these reactions may also be directly used. However, this does not afford any advantage because it has been found that the desired stabilizing effect can only be obtained with the amidosilanes (7) when a sufficient number of unreacted amidosilyl groups is still present in the end product. Accordingly, the amidosilyl groups have to be used in excess in relation to the aminoalkyl silanes (4) and other constituents consuming amidosilyl groups.

In the same way as standard moisture-hardening silicone pastes, the compositions according to the invention may be prepared in planetary mixers, butterfly mixers, dissolvers, continuous mixing screws or other machines suitable for the production of pastes. The products are packed in hermetically sealable containers, for example cartridges. Contact with atmospheric moisture should be avoided as far as possible during the production process.

The invention is illustrated by the following Examples.

EXAMPLE 1

46 parts by weight of an $—OSi(OCH_3)_2—CH_3$-terminated polydimethyl siloxane, viscosity 50 Pas, were mixed with 19 parts by weight of an $—OSi(CH_3)_3$-terminated polydimethyl siloxane (viscosity 0.1 Pas) and with 26 parts by weight of a chalk filler treated with stearic acid in a planetary mixer. 2 parts by weight of a silane corresponding to the formula $CH_3Si[N(CH_3)COC_6H_5]_2OC_2H_5$ were then mixed in. The mixture was completed by the addition of 5 parts by weight of a hydrophobic pyrogenic silica, 0.8 part by weight of a silane corresponding to the formula $H_2NCH_2CH_2CH_2Si(OC_2H_5)_3$ and 0.1 part by weight of a catalyst solution consisting of 65% $(C_4H_9)_2Sn[OCOCH(C_2H_5)C_4H_9]_2$ and 35% toluene.

To evaluate the mechanical properties, the paste was drawn out to form a 2 mm thick test sheet, stored for 14 days at 23° C./50% relative humidity and then tested in accordance with DIN 53 504:
testile strength: 1.1 MPa
E-modulus 100%: 0.57 MPa
Elongation at break: 320%.

To evaluate crosslinking behavior and adhesion, a 4 mm thick test sheet was applied to a glass plate over an area of 40×60 mm. After 24 hours, the material had hardened through to the glass surface and could not be removed from the substrate without cohesive failure.

The stability of the unvulcanized paste in storage was evaluated by an accelerated test. To this end, the sealing material was packed in tubes and stored at 100° C. Even after storage for 4 days, the material still crosslinked to form a useful elastomer.

EXAMPLE 2 (comparison)

The procedure was as in Example 1, except that 2 parts by weight of a silane corresponding to the formula $CH_3Si[N(CH_3)COC_2H_5]_2OC_2H_5$ were used instead of the amidosilane.

Mechanical properties (DIN 53 504):
tensile strength: 1.1 MPa
E-modulus 100%: 0.45 MPa
Elongation at break: 380%.

As in Example 1, a 4 mm thick test sheet hardened through to the glass surface in 24 hours, but showed no adhesion to the substrate. Even 48 hours after application, the sealing material could still easily be removed from the glass.

EXAMPLE 3 (comparison)

The procedure was as in Example 1, except that the amidosilane was left out. After storage for 4 days at 100° C., the unvulcanized paste did not crosslink in the presence of atmospheric moisture.

EXAMPLE 4

The procedure was as in Example 1, except that 2 parts by weight of a silane corresponding to the formula $(CH_3)_3SiN(CH_3)COC_6H_5$ were used instead of the amidosilane.

Mechanical properties (DIN 53 504):
tensile strength: 0.9 MPa
E-modulus 100%: 0.33 MPa
elongation at break: 480%.

In the form of a 4 mm thick layer, the material hardened in 24 hours and showed good adhesion to the glass surface. In the accelerated storability test, the paste could still be crosslinked without difficult in the presence of moisture after 4 days at 100° C.

What is claimed is:

1. Polysiloxane compositions storable in the absence of moisture and hardening in the presence of moisture, which comprise:
   (A) 100 parts by weight of a polydimethyl siloxane which contains terminal diorganyloxyorganosilyl or triorganyloxylsilyl groups and which has a viscosity of 0.1 to 100 Pas,
   (B) 0 to 100 parts by weight of an $\alpha,\omega$-bis-(trimethyl-siloxy)-polydimethyl siloxane which has a viscosity of from 0.04 to 10 Pas,
   (C) 0 to 5 parts by weight of an alkoxysilane having the formula

in which
   $R^1$ is $C_1$–$C_6$ alkyl, $C_2$–$C_6$ alkenyl or $C_5$–$C_6$ aryl;
   $R^2$ is $C_1$–$C_6$ alkyl, and a is 0 or 1,
   (D) 0.1 to 5 parts by weight of an aminoalkyl alkoxysilane containing one or more basic nitrogen atoms attached to a silicon atom through at least 3 carbon atoms,
   (E) 5 to 250 parts by weight of a reinforcing or non-reinforcing filler or filler mixture,
   (F) 0.01 to 2 parts by weight of an organometallic catalyst and
   (G) 0.5 to 5 parts by weight of an amidosilane of the formula

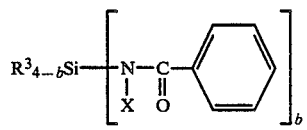

in which each $R^3$ is the same or different from any other $R^3$ and is $C_1$–$C_6$ alkyl, $C_2$–$C_6$ alkenyl, $C_5$–$C_6$ aryl or unbranched or branched $C_1$–$C_6$ alkoxy;
   X is a $C_1$–$C_4$ alkyl; and b is 1 or 2.

2. Polysiloxane compositions according to claim 1 wherein component (A) is polydimethyl siloxane which contains terminal dimethoxyorganosilyl or trimethoxyorganosilyl groups.

3. Polysiloxane compositions according to claim 1 wherein component (A) is polydimethyl siloxane which contains terminal diphenoxyorganosilyl or triphenoxyorganosilyl groups.

4. Polysiloxane compositions according to claim 1 wherein component (C) is $CH_3Si(OCH_3)_3$, $Si(OC_2H_5)_4$, $CH_2=CH-Si(OC_2H_5)_3$, $C_6H_5Si[OCH(CH_3)C_2H_5]_3$ or $CH_3Si(O\,n-C_3H_7)_3$.

5. Polysiloxane compositions according to claim 1 wherein component (D) is $H_2NCH_2CH_2CH_2Si(OC_2H_5)_3$, $H_2NCH_2CH_2NHCH_2CH_2CH_2Si(OCH_3)_3$, $H_2NCH_2CH_2CH_2SiCH_3(OC_2H_5)_2$ or $HN[CH_2CH_2CH_2Si(OC_2H_5)_3]_2$.

6. Polysiloxane compositions according to claim 1 wherein component (E) is a reinforcing filler comprising pyrogenic silica, precipitated silica or precipitated chalk.

7. Polysiloxane compositions according to claim 1 wherein component (E) is a non-reinforcing filler comprising chalk, dolomite, clay, slate powder, mica, talc, wollatonite, quartz, diatomaceous earth or carbon black.

8. Polysiloxane compositions according to claim 1 wherein component (F) is an organometallic catalyst containing titanium, aluminum or tin.

9. Polysiloxane compositions according to claim 1 wherein component (F) is a dialkyl tin dicarboxylate.

10. Polysiloxane compositions according to claim 9 wherein the dialkyl tin dicarboxylate is $(C_4H_9)_2Sn(OCOCH_3)_2$, $(C_8H_{17})_2-Sn(OCOC_{11}H_{23})_2$ or $(C_4H_9)_2Sn[OCOCH(C_2H_5)C_4H_9]_2$.

11. Polysiloxane compositions according to claim 1 wherein component (G) is $(CH_3)_3SiN(CH_3)COC_6H_5$, $(CH_3)_2Si([N(CH_3)COC_6H_5]_2$, $CH_3(CH_2=CH)Si[N(CH_3)COC_6H_5]_2$, $CH_3(C_6H_5)Si[N(CH_3)COC_6H_5]_2$, $CH_3(C_2H_5O)Si[N(CH_3)COC_6H_5]_2$, $CH_3(C_2H_5O)_2SiN(CH_3)COC_6H_5$, $CH_3(CH_3O)Si[N(CH_3)COC_6H_5]_2$ or $CH_3[C_2H_5(CH_3)CHO]_2SiN(CH_3)COC_6H_5$.

12. Polysiloxane compositions according to claim 1 wherein component (G) is $(CH_3)_3SiN(CH_3)COC_6H_5$ or $CH_3(C_2H_5O)Si[N(CH_3)COC_6H_5]_2$.

* * * * *